N. B. CREIGHTON & S. BLOCK.
VALVE.
APPLICATION FILED JAN. 28, 1911.
1,028,681.
Patented June 4, 1912.
2 SHEETS—SHEET 1.
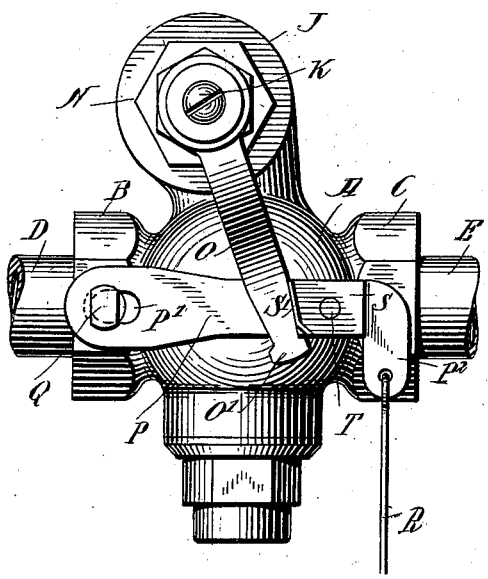
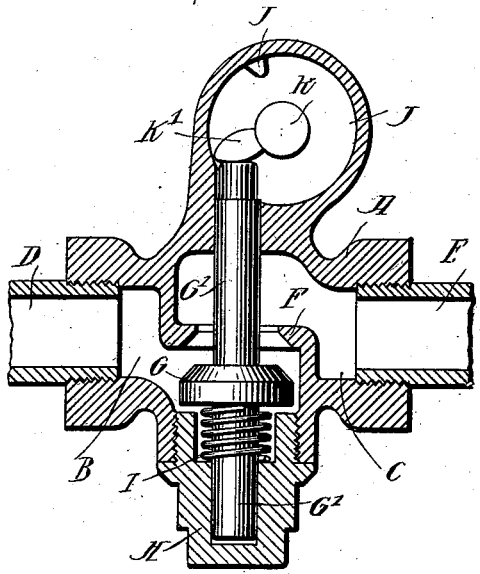
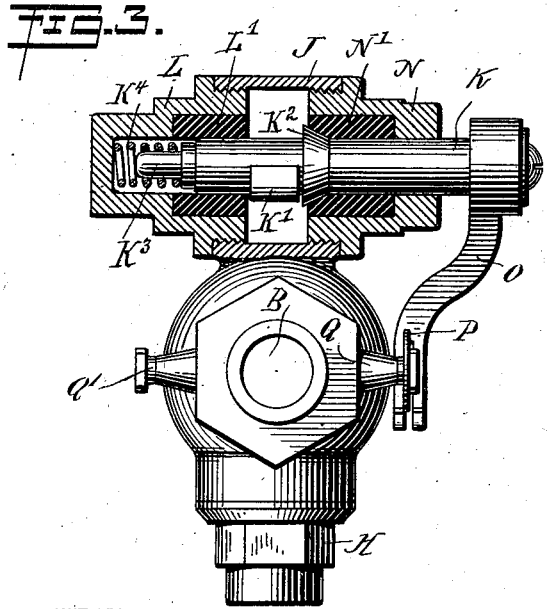
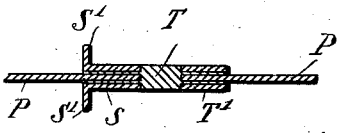
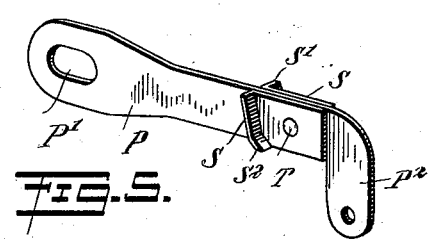
WITNESSES
INVENTORS
Nelson B. Creighton
Samuel Block
BY
ATTORNEYS

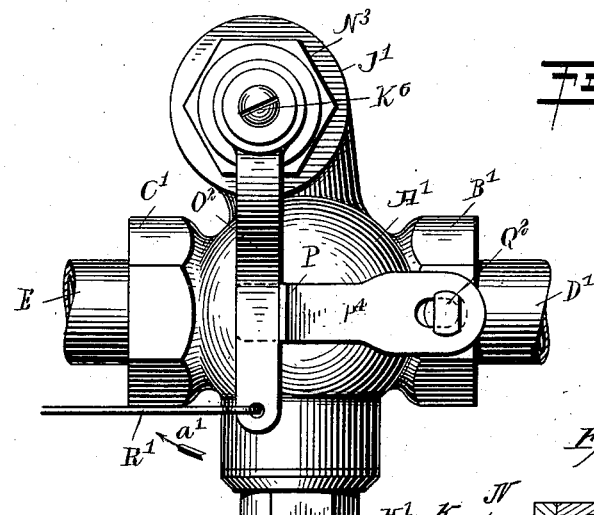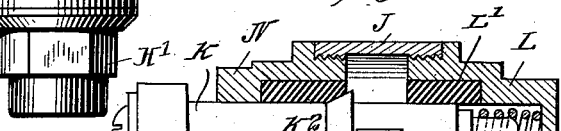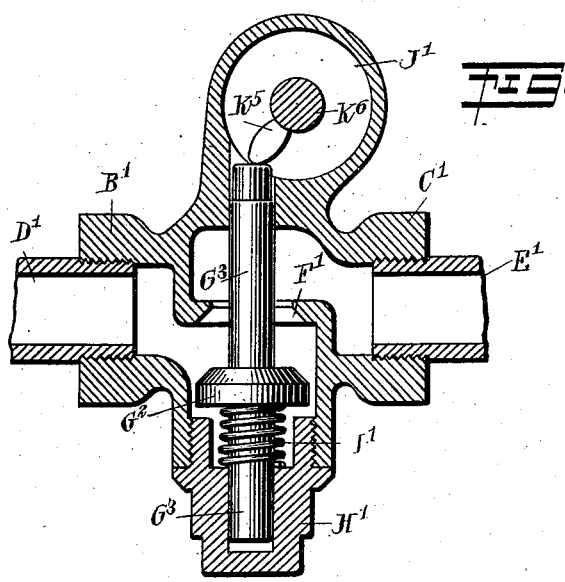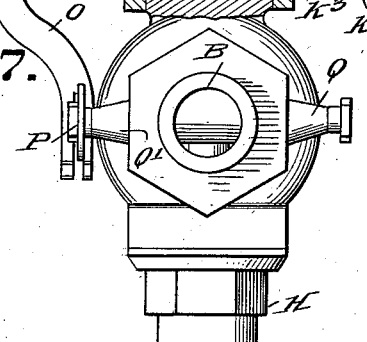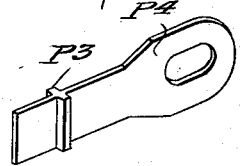

UNITED STATES PATENT OFFICE.

NELSON B. CREIGHTON AND SAMUEL BLOCK, OF NEW YORK, N. Y.

VALVE.

1,028,681.   Specification of Letters Patent.   Patented June 4, 1912.

Application filed January 28, 1911. Serial No. 605,219.

*To all whom it may concern:*

Be it known that we, NELSON B. CREIGHTON and SAMUEL BLOCK, both citizens of the United States, and residents, respectively, of the city of New York, Maspeth, borough of Queens, in the county of Queens and State of New York, and of the city of New York, borough of Brooklyn, in the county of Kings and State of New York, have invented a new and Improved Valve, of which the following is a full, clear, and exact description.

The invention relates to valves such as shown and described in the application for Letters Patent of the United States, No. 912,816, granted to Nelson B. Creighton, on February 16, 1909.

The object of the present invention is to provide a new and improved valve arranged to normally hold the valve in an open position for the passage of gas, liquid or other fluid, to allow of releasing the valve from a distant point whenever it is desired to close the valve, and to allow the valve to close automatically in case of fire.

For the purpose mentioned use is made of a spring-pressed valve disk engaged at its stem by an actuating device for normally holding the valve disk in an open position, and a releasing device engaging the said actuating device and adapted to release the same to allow the valve disk to move to its seat and thus close the valve.

A practical embodiment of the invention is represented in the accompanying drawings forming a part of this specification, in which similar characters of reference indicate corresponding parts in all the views.

Figure 1 is a side elevation of the valve; Fig. 2 is a sectional side elevation of the same; Fig. 3 is a cross section of the same; Fig. 4 is an enlarged sectional plan view of the releasing lever; Fig. 5 is a perspective view of the same; Fig. 6 is a side elevation of a modified form of the valve; Fig. 7 is a rear sectional elevation of the same; Fig. 8 is a perspective view of the stop arm; and Fig. 9 is a cross sectional view of the valve, showing the locking and releasing means arranged at the side of the valve body opposite that shown in the other views.

The valve body A of the valve shown in Figs. 1, 2 and 3, is provided with an inlet B and an outlet C connected with the pipes D and E, respectively, and intermediate the said inlet B and the outlet C is arranged a valve seat F, on which is adapted to be seated a valve disk G having a stem G', the lower end of which is mounted to slide in a cap H screwing on the bottom of the valve body A. A spring I is coiled on the lower portion of the valve stem G' and rests with one end on the cap H while the other end presses against the under side of the valve disk G to move the latter onto the seat F whenever the valve disk is released, as hereinafter more fully explained.

The upper end of the valve stem G' extends into a chamber J formed on the valve body A, and into the said chamber J extends a rock shaft K provided with a tooth K' adapted to engage the upper end of the valve stem G' to swing the latter downward and likewise the valve disk G, to hold the latter normally off its seat, as plainly indicated in Fig. 2. In the chamber J is arranged a stop J' for limiting the return swinging movement of the tooth K' and consequently the shaft K.

One end of the chamber J is closed by a screw plug L and the other end is closed by a screw plug N adapted to be interchanged with the plug L so as to permit the use of the plugs L and N on either end of the chamber J (see Figs. 3 and 9). The screw plugs L and N are provided with bearings L' and N', of non-corrosive material, for the rock shaft K to turn in, and the said rock shaft is provided with a conical collar $K^2$ engaging a corresponding seat on the bearing N', and the reduced end $K^3$ of the rock shaft K is pressed on by a spring $K^4$ held in the screw plug L, the spring $K^4$ serving to firmly seat the collar $K^2$ on its seat in the bearing N' to prevent leakage of gas or other fluid passing through the valve.

On the outer end of the shaft K is secured an arm O having its free end slotted to straddle a releasing lever P fulcrumed on a stud Q forming part of or attached to the valve body A, at one side thereof, the other side of the valve body A being provided with a similar stud Q' to permit of using the releasing lever P on the stud Q' when interchanging the plug or stuffing box N with the plug L, as indicated in Fig. 9. The releasing lever P is provided with an elongated slot P' for removable engagement with the stud Q, which latter has a head flattened vertically, that is, at right angles to the elongated slot P' to permit of conveniently placing the lever P in position on the stud Q or Q' or removing it therefrom, if desired. The free end of the releasing lever P is provided with an angular terminal P² connected with one end of a rod R leading to a distant point, so as to permit of imparting a swinging motion to the lever P for releasing the arm O whenever it is desired to allow the valve disk G to move to its seat by the action of the spring I. The releasing lever P is provided with an abutment, preferably in the form of two plates S having angular lugs or flanges S' against which rest the forward edges of the slotted end of the arm O, as plainly indicated in Fig. 1. The plates S and the lever P are provided with registering apertures filled with a plug T of solder fusible at a low temperature, so that when the valve is heated, say by a fire that breaks out in the building, or from any other cause, then the solder plug T melts and the plates S become detached from the lever P to release the arm O and thereby allow the spring I to move the valve disk G to its seat F, thus automatically closing the valve. Solder T' of a low fusing point may also be used for fastening the plates S to the lever P, as indicated in Fig. 4, that is, either the plug T or the solder T' or both may be used for fastening the abutment in place on the lever P. The angular flanges S' have bevels S² adapted to ride over the head O' formed on the terminal of the arm O so as to prevent locking engagement of the lever P and the arm O when imparting a swinging motion to the lever P by the operator exerting a pull on the rod R.

It is understood that when the several parts are in the position illustrated in Figs. 1, 2 and 3, the spring I is compressed and the valve G is held open by the action of the tooth K' on the rock shaft K, locked in place by the arm O engaging the lugs S' of the abutment S on the releasing lever P. Now when the arm O is released, either by the operator pulling on the rod R and swinging the lever P out of engagement with the arm O, or by a fire melting the plug T or solder T' and releasing the abutments, then the spring I forces the valve disk G to its seat F to close the valve.

From the foregoing it will be seen that the valve disk G is normally held open against the tension of its spring I and when released the valve disk is moved to its seat T by the action of the spring I.

In the modified form shown in Figs. 6, 7 and 8, the valve body A' is provided with an inlet B' and an outlet C' connected with the pipes D' and E', respectively, and intermediate the said inlet B' and outlet C' is arranged a valve seat F' in which is adapted to be seated a valve disk G² having a stem G³, the lower end of which is mounted to slide in a cap H' screwed on the bottom of the valve body A'. A spring I' presses the valve disk G² to move the latter onto its seat F' whenever the valve disk G² is released, as hereinafter more fully explained. The upper end of the valve stem G³ extends into a chamber J' formed on the valve body A', and the top of the valve stem G³ is engaged by a tooth K⁵ held on a rock shaft K⁶ journaled in a stuffing box N³, closing one end of the chamber J', the other end being closed by a screw plug (not shown) interchangeable with the stuffing box N³. On the outer end of the shaft K⁶ is secured an arm O² abutting against a shoulder P³ on the arm P⁴ fulcrumed on a stud Q² secured to the valve body A'. The abutment arm P⁴ holds the arm O², the rock shaft K⁶ and tooth K⁵ in such a position that the stem G³ and valve G² are pressed downward against the tension of the spring I', as shown in Fig. 7. A rod R' is connected with the arm O² and leads to a distant point to permit imparting a swinging motion to the arm O² in the direction of the arrow a', to rock the shaft K⁶ and thus move the tooth K⁵ out of engagement with the upper end of the valve stem G³ to release the latter, when the spring I' will force the valve disk G² to its seat. When this takes place the spring I' forces the valve disk G² upward into a closed position on the valve seat F'.

By the arrangement described the valve disk G² can be quickly closed from a distant point.

Having thus described our invention, we claim as new and desire to secure by Letters Patent:

1. A valve, comprising a valve body having an inlet, an outlet and a valve seat intermediate the inlet and outlet, a spring pressed valve disk adapted to be seated on the valve seat, means including an arm for engaging the valve disk for moving it off its seat, and a locking and releasing device, comprising a movable member having an abutment for normally engaging the arm of the valve engaging means to hold it against movement in one direction and thereby hold the valve disk off its seat, and a fusible solder for holding said abutment under ordinary temperature but detaching the abutment at a higher temperature.

2. A valve, comprising a valve body having an inlet, an outlet, a separate chamber and a valve seat intermediate the said inlet and the said outlet, a spring pressed valve disk having a tendency to be seated on the said seat and having its stem extending into the said separate chamber, a rock shaft extending into the said separate chamber and having a tooth engaging the said valve stem to move the said valve disk off its seat, an arm on the outer end of the said rock shaft a lever having a detachable abutment for normally engaging said arm to hold it in a position for holding the valve disk off its seat, and solder having a low fusing point for attaching the abutment to the said lever.

3. A valve, comprising a valve body having an inlet, an outlet, a separate chamber and a valve seat intermediate the said inlet and the said outlet, a spring pressed valve disk having a tendency to be seated on the said seat and having its stem extending into the said separate chamber, a rock shaft extending into the said separate chamber and having a tooth engaging the said valve stem to move the said valve disk off its seat, an arm on the outer end of the said rock shaft, a lever having a detachable abutment for normally engaging said arm to hold it in a position for holding the valve disk off its seat, solder having a low fusing point for attaching the abutment to the said lever, and a rod connected with the said lever.

4. A valve, comprising a valve body having an inlet, an outlet, a separate chamber and a valve seat intermediate the said inlet and the said outlet, a spring pressed valve disk having a tendency to be seated on the said seat and having its stem extending into the said separate chamber, a rock shaft extending into the said separate chamber and having a tooth engaging the said valve stem to move the said valve disk off its seat, an arm on the outer end of the said rock shaft, a lever having a detachable abutment formed of an angular lug for normally engaging said arm to hold it in a position for holding the valve disk off its seat and solder having a low fusing point for attaching the lug to the said lever.

5. A valve, comprising a valve body having an inlet, an outlet, a separate chamber and a valve seat intermediate the said inlet and the said outlet, a spring pressed valve disk having a tendency to be seated on the said seat and having its stem extending into the said separate chamber, a rock shaft extending into the said separate chamber, and having a tooth engaging the said valve stem to move the said valve disk off its seat, an arm on the outer end of the said rock shaft, a lever having a detachable abutment for normally engaging said arm to hold it in a position for holding the valve disk off its seat, said abutment being formed of angular lugs on opposite faces of the said lever, the lugs and the said lever having registering apertures, and a plug of solder of a low melting point filling the said registering apertures.

6. A valve, comprising a valve body having an inlet, an outlet, a separate chamber and a valve seat intermediate the said inlet and outlet, a spring-pressed valve disk having a tendency to be seated on the said seat and having a stem extending into the said chamber, a rock shaft having a tooth engaging the said stem for moving the valve off its seat, screw plugs closing the ends of the said chamber and provided with internal bearings for the rock shaft to turn in, one of the bearings having a seat, and the shaft having a collar engaging the seat, a spring pressing the rock shaft to hold the collar in engagement with the seat, and a locking and releasing device for the rock shaft.

7. A valve, comprising a valve body having an inlet, an outlet, a separate chamber and a valve seat intermediate the inlet and outlet, a spring pressed valve having its stem extending into the said chamber, a rock shaft mounted in the chamber having a tooth engaging the valve stem for moving the valve off its seat, an arm on one end of the rock shaft outside of the valve body and having its free end slotted, a pivoted lever extending through the slot of the arm and having an abutment with which the arm engages to hold the valve open, and means for releasing the said arm from said abutment to allow the valve to close.

In testimony whereof we have signed our names to this specification in the presence of two subscribing witnesses.

NELSON B. CREIGHTON.
SAMUEL BLOCK.

Witnesses:
WM. F. ITTNER,
JOHN M. HOFFMANN.

Copies of this patent may be obtained for five cents each, by addressing the "Commissioner of Patents, Washington, D. C."